R. C. LANPHIER.
ELECTRIC METER.
APPLICATION FILED AUG. 23, 1905.
910,548.
Patented Jan. 26, 1909.
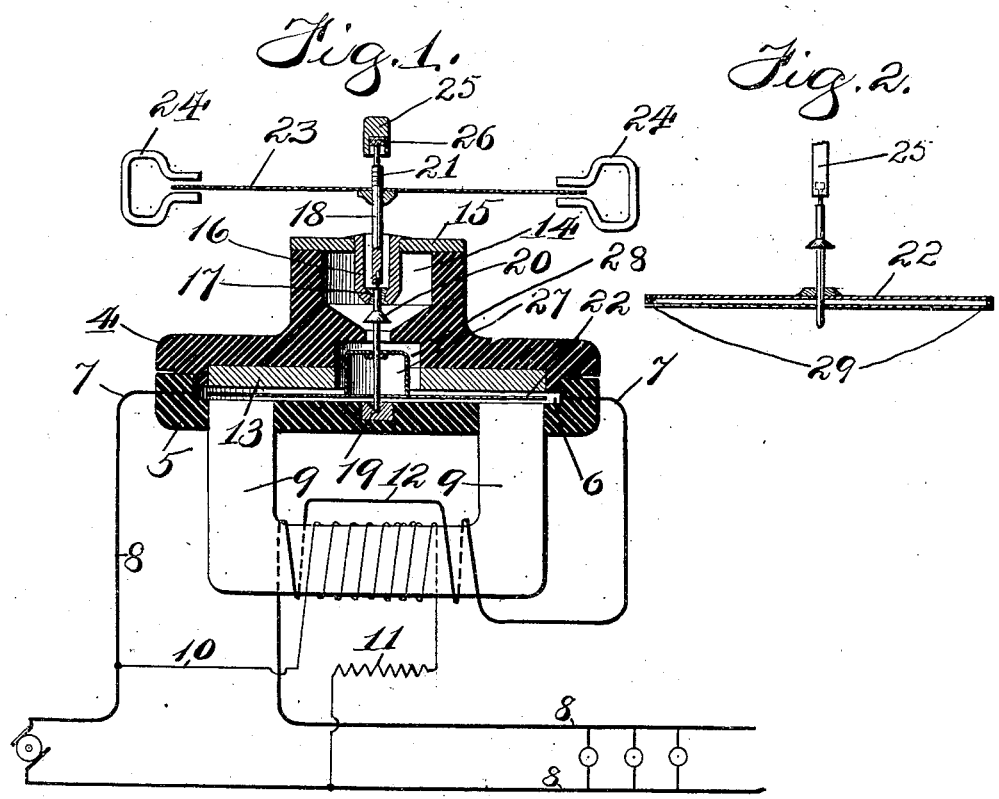
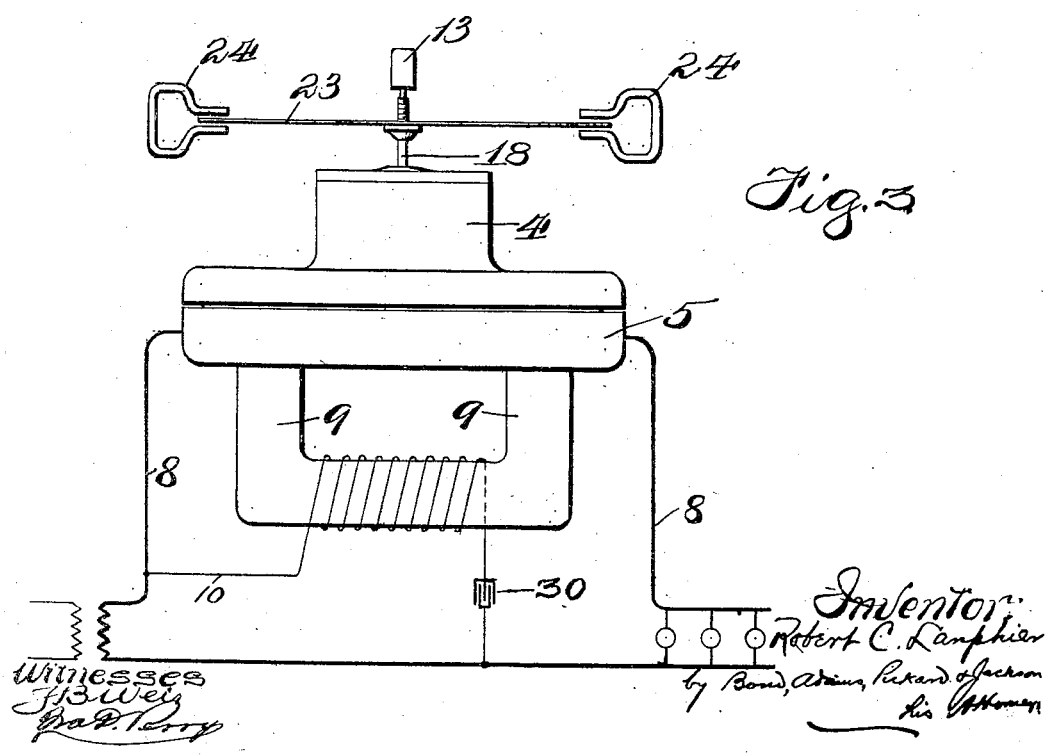

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

ELECTRIC METER.

No. 910,548.   Specification of Letters Patent.   Patented Jan. 26, 1909.

Application filed August 23, 1905. Serial No. 275,437.

*To all whom it may concern:*

Be it known that I, ROBERT C. LANPHIER, a citizen of the United States, residing at Springfield, in the county of Sangamon, in the State of Illinois, have invented certain new and useful Improvements in Electric Meters, of which the following is a full and complete description, reference being had to the accompanying drawings.

My invention relates to electric meters of the fluid contact or so-called "mercury motor type," in which the rotating element or armature is submerged in mercury contained in a suitable chamber, and carries the main current passing to the load to be measured and which have a shunt energizing field or fields with the coils connected across the circuit in such relation as to produce a field proportionate to the pressure upon the circuit. The reaction between such pressure field and the main load current passing through the armature produces rotation, according to well-known and established principles.

The principal object of my invention is to produce a true watt-hour meter for either direct or alternating currents instead of an ampere-hour meter; and this object, broadly speaking, is effected by reducing to a minimum the damping effect of the shunt driving field without proportionately reducing the torque, and by the use of an independent metallic damping disk with a permanent magnet or magnets acting upon it in such a way that the damping effect of the magnets upon the said independent damping disk will be very much greater than the damping effect produced by the shunt energizing coils upon the driving disk.

Heretofore, meters of this general character, in which the shunt energizing coils both operate to drive the disk, and also to brake the disk to prevent too rapid rotation, while working accurately so long as the voltage remained constant, were inaccurate when there was a change of voltage. This is due to the fact that whereas with the change of voltage the driving power varies directly as the voltage, the braking power, or the damping effect, caused by the interaction of the energizing fields and the Foucault or eddy currents produced in the damping disk thereby,—varies as the square of the current.

In my improved meter, as hereinafter described, the external damping disk with its magnetic field is so arranged as to produce a damping effect from four to five times greater than the damping effect of the shunt field, and by this means for a variation of ten per cent. of voltage, the error would be reduced from about ten per cent. to an error of about one and a half to two per cent. Another advantage of this large external damping effect is to greatly reduce the natural error in the load speed curve upon heavy loads, due to the fluid friction of the mercury, which, in most types of mercury meters, has to be compensated for.

When used in an alternating current meter, the shunt driving field has very little damping effect, and in case no permanent magnets are used, nearly all the retardation is produced by mercury fluid friction. The load speed curve, therefore, falls off rapidly on increasing the load, making such a meter of little value for practical purposes. By providing such a meter, however, with a powerful external damping field, the speed is reduced by this means so greatly in proportion to the retardation caused by the mercury friction, that the load speed curve is straightened out, and the error is a very small one throughout its entire range.

Another object of my invention is to produce a new and improved armature, which, although formed of very thin metal to reduce the volume of the Foucault or eddy currents and the consequent damping effect, is so constructed as to float up the spindle and attached brake disk so as to produce a minimum of friction.

Other objects of my invention are improvements in electric meters of the type described in sundry details, in the manner hereinafter pointed out.

I accomplish these objects by means of the mechanism hereinafter described.

What I consider as new will be pointed out in the claims.

In the drawings:—Figure 1 is a side elevation, partly in vertical section, of my improvements as applied to a direct current meter. Fig. 2 is a modification, showing another form of my improved driving disk showing a modified form of disk in section. Fig. 3 is a side elevation of my meter as used upon an alternating current.

Referring to the drawings:—4—5 indicate two portions of the casing formed of non-magnetic and preferably of insulating material and joined together so as to form a shallow circular chamber 6 between them.

7 indicates contacts which pierce the walls of the casing 5 and are adapted to be connected with the circuit 8.

9 indicates an electro-magnet, preferably formed of laminated plates with its poles entering the base of the casing 5 at a suitable distance upon each side of the center thereof. The magnet 9 is energized by shunt coil 10 into which is interposed a suitable resistance 11, which operates in the usual manner and for the usual purpose.

12 indicates a few turns of compound series winding upon the magnet 9, connected in series with the armature so as to carry the main load current which passes through the armature.

13 indicates an iron or steel plate which is inserted into the top portion 4 of the casing, and whose under surface forms the greater part of the upper surface of the mercury chamber 6, and which forms a return path for the magnetic lines of force proceeding from pole to pole of the magnet 9. The return piece 13 is provided with a central circular opening for the admission of the parts hereinafter described.

14 indicates a chamber in the top of the casing piece 4 which slopes downward to a narrow central opening at its bottom, and which is closed at the top by the cap 15.

16 indicates a downwardly projecting sleeve secured to the cap 15, and projecting a suitable distance downward into the chamber 14. Its lower end is drawn together, and supports a pierced jewel 17, having an opening just sufficient to permit the passage through it of the spindle hereinafter described.

18 indicates a spindle, which, for the purposes of convenience of construction, is preferably constructed of two parts, the squared upper end of the lower one inserted into a corresponding opening in the lower end of the upper member, and which is journaled at its lower end in a bearing 19 inserted into the lower part 5 of the casing, and centrally located with reference to the chamber 6.

20 indicates a conical cap which is secured with the large end downward upon the spindle 15 within the chamber 14, and below the sleeve 16, and is designed in case the meter is upset or severely jostled to prevent the mercury from flowing down the shaft of the spindle 18 and out through the pierced jewel 17.

21 indicates a worm which is connected with any suitable recording train, which, being of any approved form of well-known construction, is not shown.

22 indicates the armature or driving disk which is mounted upon the spindle 18 so as to revolve within the chamber 6. The disk 22 is preferably made of copper, and is very thin, being made of no greater thickness than will be sufficient to transmit the load current which passes through the circuit, and to maintain the requisite rigidity in said chamber. As a general direction, I have found that in a meter adapted to measure a full load current of ten amperes, a thickness of fifteen thousandths of an inch in a disk 2.2 to 2.4 inches in diameter is a proper proportion. The main part of the chamber 6 within which the disk 22 rotates, is also made very shallow. The driving disk 22 is also thoroughly amalgamated to reduce, as far as possible, the mercury friction, but will work properly if only the periphery and a narrow rim are amalgamated, the flat faces being suitably insulated in such case. It will be obvious that with a disk of such relative thinness, the eddy currents produced by the shunt energizing field will be very much less than in a disk of the usual thickness, and the damping effect thereby correspondingly diminished.

23 indicates a damping or brake disk, formed preferably of copper, or aluminum, and of a much greater relative thickness or conductivity than that of the driving disk 22. The brake disk 23 is secured upon the spindle 18 externally to the casing, as shown. With the driving disk and brake disk so formed and constructed it will be seen that the driving disk will be of relatively high resistance to induced or eddy currents while the brake disk will be of relatively low resistance to such currents.

24 indicates powerful permanent magnets, which, as shown, are preferably in the form of horse-shoe magnets, embracing the disk 23 between their poles. The magnetic field of the magnets 24, and the brake disk 23, are so constructed and proportioned in comparison with the driving disk and with the shunt energizing coils, that the braking effect of the upper disk will be about eighty per cent., and that of the lower disk about twenty per cent. of the entire braking effect.

25 indicates a support which carries a jewel 26, against which the upper end of the spindle 18 bears.

For the purpose of reducing friction to the minimum, it is desirable that the driving disk should be floated upward in the mercury contained in the chamber 6 with a force slightly more than enough to carry the weight of the spindle and external braking disk, so that the spindle will press slightly upward against the under surface of the jewel 26. As it is obvious that a driving disk of sufficient thinness to reduce the braking effect of the energizing coils to the minimum would not have sufficient displacement to float the spindle and external disk upward as above described, I secure upon the surface of the driving disk 22 a hollow copper float 27, which revolves within a central enlargement 28 of the chamber 6. This float is made of such size as to secure the proper displacement necessary to float the weight of itself, the attached driving disk, the spindle and the external braking disk slightly upward, and being of relatively small circumference, and being well amalgamated, I have found that the mercury friction on this float is not sufficient to cause any appreciable error at various load speeds.

Fig. 2 shows a modification of my invention in this respect, in which the disk 22 is formed of two very thin plates of copper, separated a short distance, and secured together by a ring 29 of some light insulating material, so that the disk is hollow across almost its entire diameter. By this means, sufficient displacement is secured to produce the proper upward flotation whether the preferred form of the disk shown in Fig. 1, or the modification shown in Fig. 2 is employed, a buoyancy chamber is formed, in the first case by the float 27, and in the latter case, by the hollow interior of the disk. This will enable the disk itself in either case to be made of very thin material only thick enough to transmit the load-current, and at the same time to have sufficient displacement to support the weight of the parts and to produce the slight upward flotation or pressure against the upper jewel 26, as above described.

Referring to Fig. 3, which shows my device as applied to an alternating current meter, it will be sufficient to say that the meter is in all respects similar to the meter shown in Fig. 1 above described, with the exception that the series coils 12 are omitted from the magnet 9, and that there is interposed into the shunt circuit 10 a condenser 30, connected in series with the pressure coil 10 for the purpose of bringing the phase of the shunt field magnetism into zero relation with the impressed electro-motive force. In all other respects, the construction of the meter is the same, and as this method of operating an alternating current meter, and this mechanism for operating the same form no part of the invention involved in this application, I believe it is not necessary to show or to describe the same further herein.

What I claim as new and desire to secure by Letters Patent, is:—

1. In an electric meter, the combination with a mercury chamber, contacts entering said mercury chamber at each side thereof and adapted to be connected to an electric circuit, a driving disk in said chamber formed of relatively very thin material, and an energizing electro magnet adapted to be connected in shunt relation with said circuit, of a brake disk formed of relatively thick material, and a magnet acting upon said brake disk, said brake disk and said magnetic field having a relatively very high damping effect, substantially as described.

2. In an electric meter, the combination with a casing, a mercury chamber in said casing, contacts entering said chamber upon opposite sides thereof and adapted to be connected to an electric circuit, a spindle entering said casing, a driving disk mounted on said spindle in said chamber and formed of relatively very thin material, and an energizing electro magnet adapted to act upon said driving disk and connected in shunt relation with said circuit, of a brake disk mounted on said spindle external to said chamber and formed of relatively thick material, and a magnet acting on said brake disk, said brake disk and said magnet having a very high damping effect as compared with that of the driving disk and its energizing field, substantially as described.

3. In a mercury electric meter, the combination with a casing, a shallow mercury chamber in said casing having a central enlargement, contacts entering said chamber upon each side thereof and adapted to be connected with an electric circuit, and an energizing electro magnet connected in shunt relation with said circuit, of a spindle passing through said casing and journaled therein, a driving disk of relatively thin metal secured to said spindle in said chamber, a hollow cylindrical float secured to said driving disk concentric therewith, a brake disk mounted on said spindle external to said chamber formed of relatively thick material, and a permanent magnet adapted to act upon said brake disk, said brake disk and magnet having a relatively very high damping effect as compared with that of said driving disk and its energizing field, substantially as described.

4. In a mercury electric meter, the combination with a casing, a mercury chamber in said casing, a second chamber above said mercury chamber connected thereto by a restricted opening, a cover plate for said second chamber, and a sleeve projecting into said second chamber, of a spindle journaled in said sleeve and in said casing, a driving disk on said spindle in said chamber carrying the main current, a damping disk mounted on said spindle external to said mercury chamber, a bearing for the upper end of said spindle, and means on said driving disk for producing a slight upward thrust of the rotating elements, substantially as described.

5. In a mercury electric meter, the combination with a casing, a mercury chamber in said casing, a second chamber above said mercury chamber connected therewith by a restricted opening, a cover plate for said second chamber, and a sleeve projecting into said second chamber, of a spindle journaled in said sleeve and in said casing, a driving disk on said spindle in said chamber carrying the main current, a damping disk mounted on said spindle external to said mercury chamber, a bearing for the upper end of said spindle, and a float on said driving disk immersed in the mercury and adapted to produce a slight upward thrust of the rotating elements against the upper bearing, substantially as described

ROBERT C. LANPHIER.

Witnesses:
GEO. O. BUNN,
GEORGE A. BATES.